(12) United States Patent
Somes

(10) Patent No.: US 8,787,354 B2
(45) Date of Patent: Jul. 22, 2014

(54) APPARATUSES, METHODS AND SYSTEMS FOR TIERED ROUTING ENGINE

(75) Inventor: Brian Somes, Garland, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 721 days.

(21) Appl. No.: 12/550,174

(22) Filed: Aug. 28, 2009

(65) Prior Publication Data

US 2011/0051714 A1 Mar. 3, 2011

(51) Int. Cl.
*H04L 12/66* (2006.01)
*H04L 12/50* (2006.01)

(52) U.S. Cl.
USPC .................. 370/352; 370/384; 370/386

(58) Field of Classification Search
CPC .......... H04Q 3/0025; H04Q 3/0045; H04L 63/0428; H04L 63/08; H04L 65/1006; H04L 65/1026; H04L 65/103
USPC ......... 370/352, 353, 354, 401, 493, 494, 495, 370/219, 220.01, 131, 1.04, 384, 386, 426, 370/522, 254; 379/220, 222, 224, 229, 207, 379/219, 230, 901, 221.02, 221.05, 221.06, 379/221.14, 221.15, 133, 22, 115.01; 709/220, 225; 455/446
See application file for complete search history.

(56) References Cited

U.S. PATENT DOCUMENTS

| | | | |
|---|---|---|---|
| 5,311,583 A * | 5/1994 | Friedes et al. .......... 379/210.01 |
| 5,982,869 A * | 11/1999 | Lozano et al. .......... 379/220.01 |
| 6,385,458 B1 * | 5/2002 | Papadimitriou et al. ... 455/456.2 |
| 7,920,548 B2 * | 4/2011 | Lor et al. ..................... 370/352 |

* cited by examiner

Primary Examiner — Asad Nawaz
Assistant Examiner — Joel Hamel

(57) ABSTRACT

("TRE") provides an automatic routing, selecting, processing for calls placed in an international network according to a selected International Tier Level for premium or guaranteed delivery. In one embodiment, a platform initiates international tiered routing information to a gateway based on a pre-set platforms' knowledge of the terminating gateway topology, Automatic Number Identification, and assigned services that requires such transmission. In one embodiment, a user may select a tier to route an international call. In another embodiment, the contextual fields of a communication mechanism define tags and tier levels indicating determining, routing and handling information to be sent to a validated gateway, or routing devices. In one embodiment, contextual tags includes customized domain name and global descriptors of compatible network components, delivery control, trunk group service ID, trunk-related tier level, and other trunk-related service attributes for tiered routing.

21 Claims, 10 Drawing Sheets

APPARATUSES, METHODS AND SYSTEMS FOR TIERED ROUTING ENGINE

BACKGROUND

The Internet Engineering Task Force (IETF) RFC 4904 defines a standard Session Initiation Protocol (SIP) protocol mechanism to transport gateway trunk information between gateways to direct routing at a receiving gateway. RFC 4904 describes this mechanism as mainly a "TDM origination—VoIP—TDM termination perspective". In RFC 4904, for example, the tgrp tag is only a physical TDM trunk designation to a carrier and the rn-context is only generically described as a "scope" of where the trunk-group information is valid or understood.

BRIEF DESCRIPTION OF THE DRAWINGS

The accompanying appendices and/or drawings illustrate various non-limiting, example, inventive aspects in accordance with the present disclosure.

Figure 1:
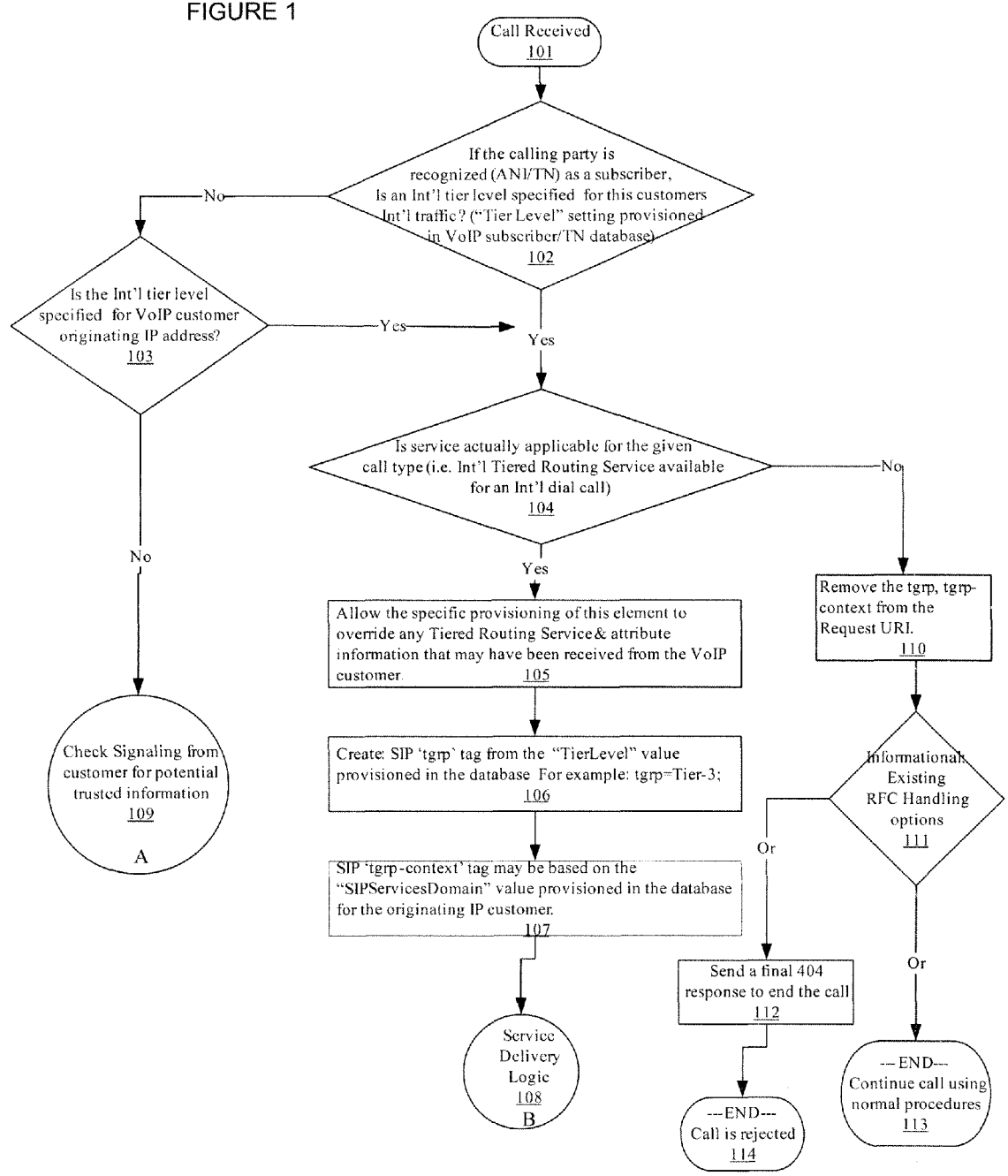
FIG. 1 shows an implementation of logic flow in an embodiment of the APPARATUSES, METHODS AND SYSTEMS FOR TIERED ROUTING ENGINE (hereinafter "TRE")

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION OF PREFERRED EMBODIMENTS

TRE

This disclosure details the implementation of methods, systems and computer program products for International Tiered Routing. There are a number of standard mechanisms/tags that may be used to support International Tiered Routing. There are numerous mechanisms that can be used for routing calls through International Tiered Routing. There are several ways to pass context information for an international call. Some of these ways include SIP, CIC or SIP Request-URI.

For example in one non-limiting implementation, the SIP tgrp & tgrp-context (RFC 4904) may be utilized. This mechanism is defined in SIP as a way to terminate calls to specific trunks from IP network and may be used to include termination to specific services such as International Tiered Routing.

In another implementation, a standard mechanism such as the npdi, rn, rn-context (RFC 4694) may be used. This mechanism supports US Number Portability but may be configured to support International Tiered Routing where the rn-context may indicate the Tiered Routing Service domain, and rn may be used as the Tier Level attribute/instruction for the routing service.

In another implementation, the cic and cic-context, that support national carrier routing and identification, may be configured to support International Tiered Routing where the cic-context indicates a Tiered Routing Service domain, and cic may be used as the Tier Level attribute/instruction for the routing service.

In one embodiment, the SIP Request-URI userinfo digits along with phone-context as used for normal call routing in SIP may be configured where the phone-context may indicate that the userinfo digits will fall within a Tiered Routing Service domain, and prefix digits may be added to the userinfo digits to carry the tier level attribute.

Any existing standard SIP mechanism or any new communication mechanism may be configured for communication of a service domain or service indicator to apply to a call where attributes associated with the indicated service for carrying out the indicated service by an element that recognizes the services domain for correct forwarding.

Furthermore, the TRE is robust and flexible and can contemplate several other mechanisms for contextually ascertaining the originating and consequently international call routing to a destination.

Some embodiments of the Tiered Routing Engine ("TRE") utilize the standard IETF mechanisms to implement services for directed trunk termination between Time Division Multiplexing (TDM) networks across a Voice over Internet Protocol (VoIP) network. For example, one embodiment may give existing wholesalers an option to upgrade to a premium level of international routing for International Direct Distance Dialing (IDDD) traffic. In one embodiment a wireless network may allow hand-off for their international traffic over the wireless network to a broadband VoIP Network to Network Interface (NNI). In another embodiment, users may be able to order and create a custom level or tier of service from available International carriers. In yet another embodiment, all VoIP originated IDDD traffic from Long Distance (LD) networks can be routed away via direct SIP connection to the International Network Gateways to reduce traffic over the LD networks and free up TDM ports.

It is to be understood that, depending on the particular needs and/or characteristics of a customer, various embodiments of the TRE may be implemented that enable a great deal of flexibility and customization by any communication mechanism. In one embodiment TRE utilizes SIP and may route within the context of tiered premium routing for United States dialed IDDD traffic from both the TDM Option 1 LD network and the broadband VoIP network, as well as between International Gateways. However, it is to be understood that the system described herein may be readily configured or customized for a wide range of other applications or implementations. For example, aspects of TRE may be adapted for other network and routing implementations with other protocols. It is also to be understood that the TRE may be further adapted to other implementations and/or networking applications.

In one embodiment, a communication mechanism such as SIP's context tags 'tgrp' and 'tgrp-context' let one gateway force a call to be routed out on a specific trunk that belongs to another gateway programmed to recognize this information. The routing information is designated in the tgrp tag and the domain name or global context is designated in the tgrp-context.

FIG. 1 is a logic flow of an implementation of an embodiment of TRE. In one implementation of FIG. 1, a service creating and controlling VoIP element is described. The embodiment shown in FIG. 1 supports the International tiered routing service but this mechanism may be extended for supporting other services. In 101 of FIG. 1, a call originating from a VoIP customer, for example a wholesale or a retail customer may be received. A customer may be identified based on traffic coming from a preselected IP origination, or a customer may be identified individually based on the ANI/TN across all traffic coming from a given IP origination.

In 102, it may be determined if the calling party is recognized (for example, by ANI/TN) as a subscriber and if a tier level specified for a customer's International traffic in a subscriber database is provisioned in a VoIP subscriber/TN database. If a calling party is not recognized as for example an (ANI/TN) subscriber, it may be determined if the call is from a VoIP customer. In 103, it is also determined if an international tier level is specified for a VoIP customer through an originating IP address. In one implementation, a tier level for a customer may be provisioned on an originating IP/gateway basis in an IP database. If no tier information is found to be specified, the connection may be checked in 109 for any signaling problems in receiving trusted information from a customer.

If in the implementation of FIG. 1, an international tier level is specified in 103 or 103, it is further determined in 104 if a service of international routing is applicable for a given received call. If the service for international routing is selected in 104, the implementation of FIG. 1 allows specific provisioning to override any Tiered Routing Service and attribute information that may have been received from the VoIP customer. In one implementation of 106, SIP 'tgrp' tag is created from the "TierLevel" value provisioned in the database, for example, tgrp=Tier-3. Further, in 107 a SIP 'tgrp-context' tag may also be created based on the "SIPServicesDomain" value provisioned in the database for the originating IP customer. In another implementation, for additional flexibility the value actually used for SIP tgrp-context may be determined later based on the selected element/gateway which this call will be sent to. After tag creation in 106 and 107, a service delivery logic is applied in 108.

If in 104 a determination is made an international routing service is not applicable in 104, contextual tags such as the trgp, tgrp-context from the request URI are removed in 110. In 111, an existing RFC handling options are selected, where the processing is ended in 113 and the received call is continued using other procedures. Or a final 404 response to end the call may be sent to 112 and the call is rejected in 114.

Figure 2:
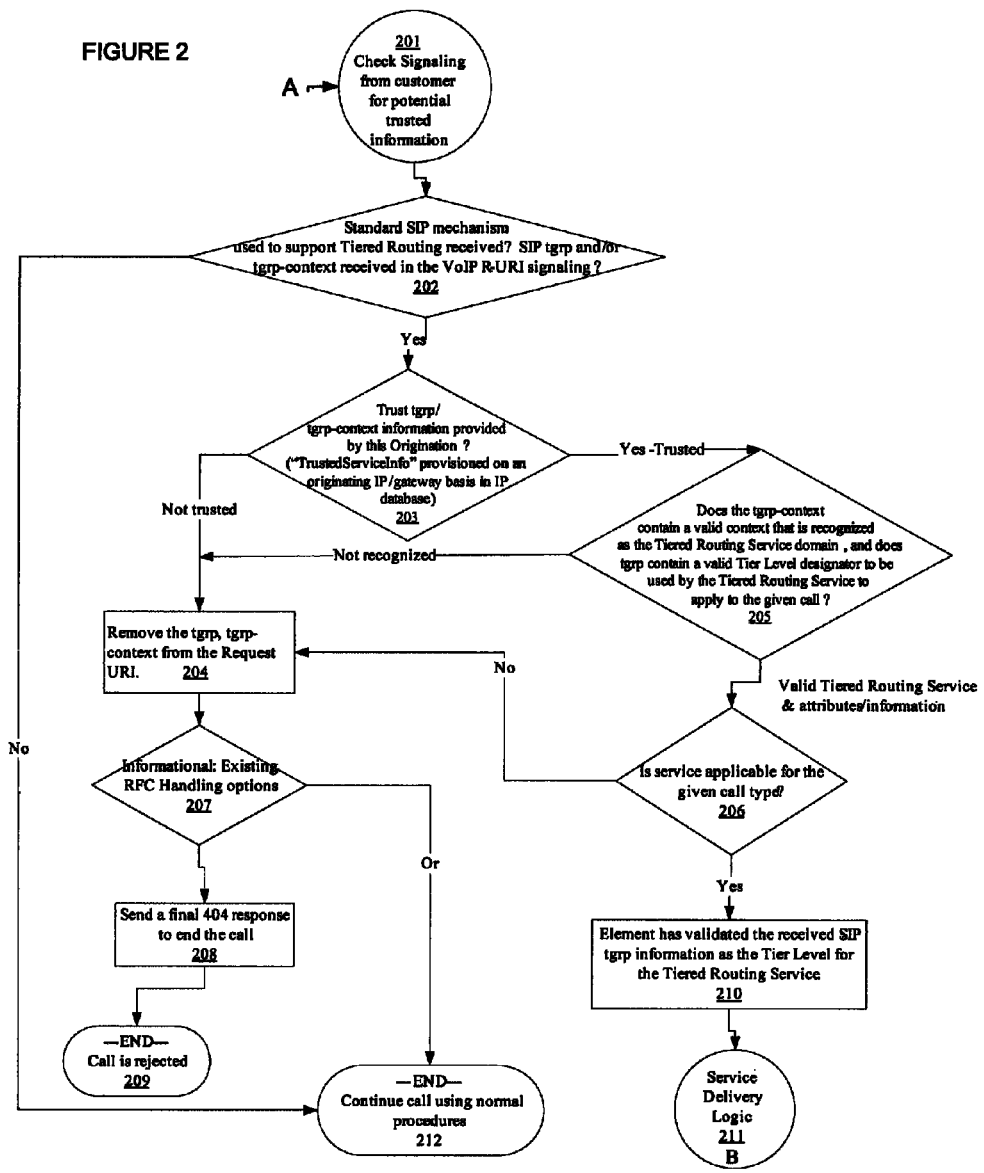
FIG. 2 shows an implementation of logic flow in one embodiment of TRE.

FIG. 2 is a continuation of the implementation of FIG. 1. In 201, a check is performed on signaling from customers for potential trusted information. In 202, it is determined if a standard communication mechanism is received that may support Tiered Routing. For example in one implementation it is determined if SIP tgrp and/or tgrp-context are received in VoIP R-URI signaling in 202. In one embodiment, ff such a standard SIP mechanism may be used, then in 203, it is determined if trusted tgrp/tgrp-context information is provided by the Origination point. In one implementation, "TrustedServiceInfo" may be provisioned on an originating IP/gateway basis in an IP database. If the information provided is determined to be not trusted in 203, the trgp, tgrp-context from the request URI is removed in 204. In 207, an existing RFC handling options are selected, where the processing is ended in 212 and the received call is continued using other procedures. Or a final 404 response to end the call is sent in 208 and the call is rejected in 209.

In one implementation, if the information provided in 203 is determined to be trusted, a check is performed in 205 if the tgrp-context contains a valid context that is recognized as the Tiered Routing Service domain, and if tgrp contains a valid tier level designator to be used by the Tiered Routing Service to apply to the given call. If the contextual information is not recognized as being valid in 205, the call proceeds to 204 for further handling as described above. In one implementation, if the contextual information is recognized as valid tiered routing service and the applicable attributes are valid in 205, a further check may be performed in 206 if the international routing service is applicable in 206. If such a service is not applicable, the call proceeds to 204 for further handling as described above. If the international routing service is applicable in 206, the received tags are validated, for example the SIP tgrp information may be validated as the tier level for the tiered routing service in 210 and a service delivery logic is applied in 211.

Figure 3:
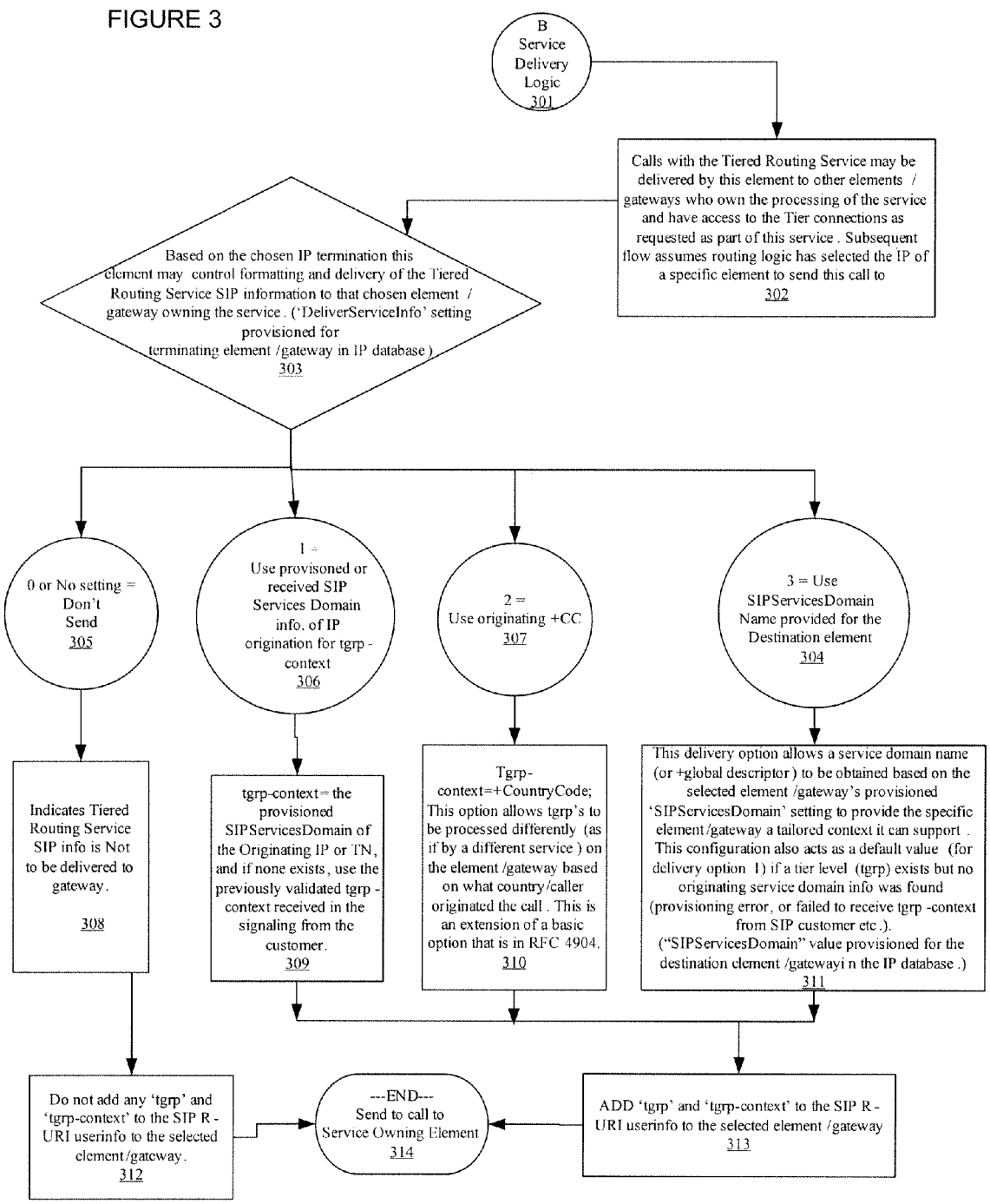
FIG. 3 shows an implementation of logic flow in one embodiments of TRE.

FIG. 3 is a continuation of the implementation of FIG. 1, element 108 and FIG. 2, element 211. In 301 calls with the tiered routing service may be delivered to other elements such as gateways that own the processing of the service and have access to the tier connections as requested as part of this service. In this implementation of FIG. 3, routing logic selects a particular IP of a specific element to send this call to. In 303, the formatting and delivery of the Tiered Routing Service SIP information will be configured based on the selected IP termination element/gateway owning the routing service. For example in one implementation, the 'DeliverServiceInfo' setting provisioned for terminating element/gateway is set in an IP database.

In this implementation, there are four settings depicted in 305, 306, 307, and 304. For example in 305 "0 or No setting=Don't Send." This setting in 305 indicates Tiered Routing Service SIP info is not to be delivered to a gateway in 308. Further in 312 no 'tgrp' and 'tgrp-context' tags are added to the SIP R-URI userinfo to send to the selected element/gateway. And in 314 the call is sent to the service element that it is applicable.

In 306, the setting is "1=Use provisioned or received SIP Services Domain info. of IP origination for tgrp-context." In 307, "tgrp-context=the provisioned SIPServicesDomain of the Originating IP or TN" and if none exists, the previously validated tgrp-context received in the signaling from the customer may be used. In 313, the 'tgrp' and 'tgrp-context' to the SIP R-URI userinfo to the selected element/gateway is added. In 307, the setting is "2=Use originating +CC." In 310, the settings are configured as "Tgrp-context=+CountryCode." This option allows tgrp's to be processed differently as through a different service on the element/gateway based on the origination of the call. In one implementation, this is configured as an extension of a basic options defined in RFC 4904. In 313, the 'tgrp' and 'tgrp-context' to the SIP R-URI userinfo to the selected element/gateway is added.

In 304, the setting is "3=Use SIPServicesDomain Name provided for the Destination element." In 311, this delivery option allows a service domain name (or +global descriptor) to be obtained based on the selected element/gateway's provisioned 'SIPServicesDomain' setting. In one implementation, the setting also may provide the specific element/gateway and a customized context that is supported and is compatible with a termination destination. This configuration may act as a default value (for delivery option 1) if a tier level (tgrp) exists but no originating service domain info can be found (provisioning error, or failed to receive tgrp-context from SIP customer etc.). In one implementation, the "SIPServicesDomain" value provisioned for the destination element/gateway is stored in an IP database. Next in 313 the 'tgrp' and 'tgrp-context' to the SIP R-URI userinfo to the selected element/gateway is added.

Figure 4:
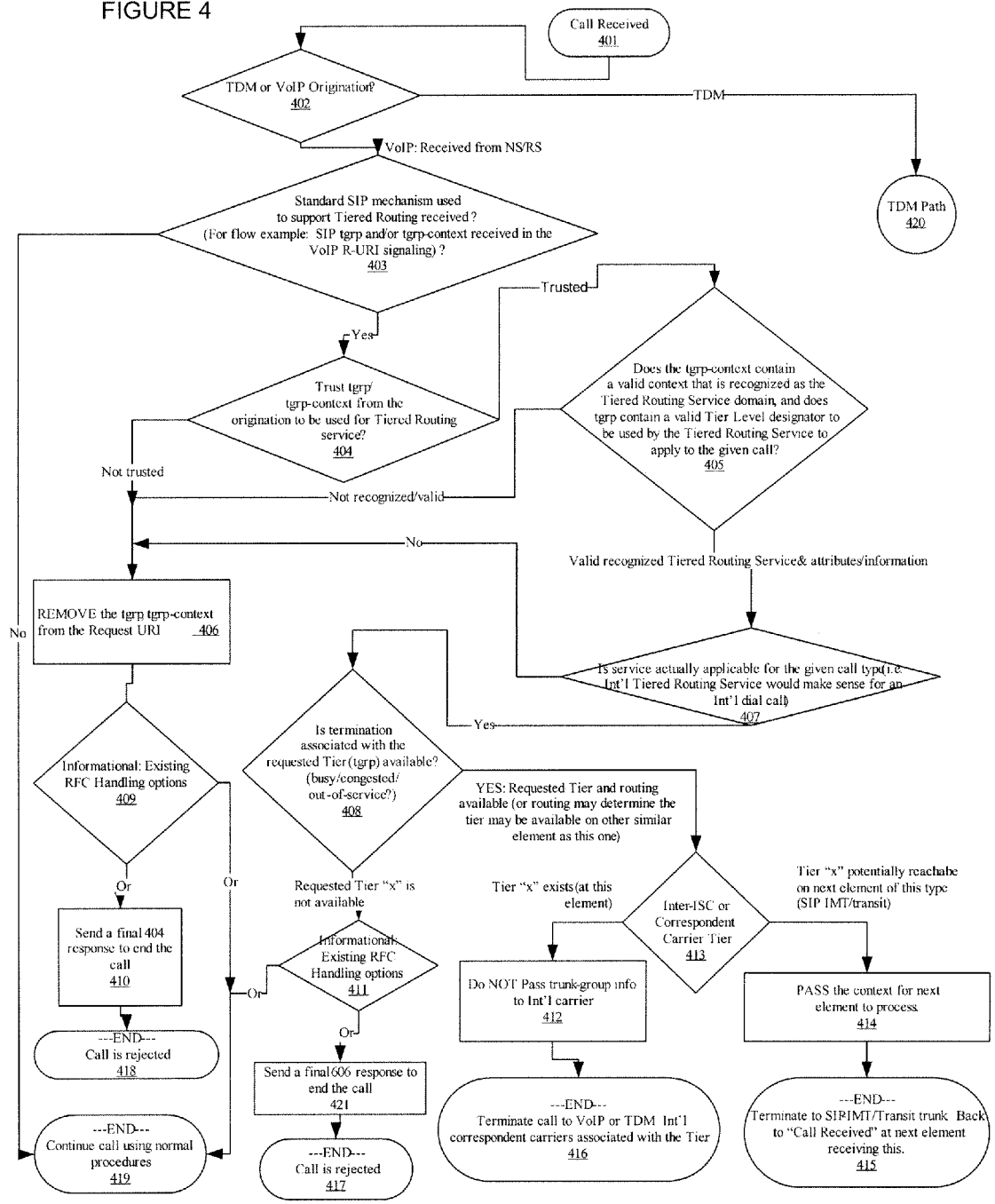
FIG. 4 shows an implementation of logic flow in one embodiments of TRE.

FIG. 4 is another implementation of TRE where a call is received in 401. A network request may be send from a originating point of a call to a routing device. In 402 it is determined in the call is TDM or VoIP origination. If the call is received from TDM, the call is processed using the TDM route. But if the call is received from a VoIP origination, it is checked in 403 if Standard SIP mechanism used to support Tiered Routing is received. If in one implementation, Standard SIP mechanism is not used to support Tiered Routing the call may proceed to 419 where the call may continue using normal procedures.

In the implementation of FIG. 3, the SIP tgrp and/or tgrp-context received in the VoIP R-URI signaling may be used. In one implementation in 404, it is determined if the tgrp/tgrp-context from the origination can be trusted to be used for tiered routing service. If a determination is made that the contextual information may be trusted, it is further checked if the tgrp-context contains a valid context that is recognized as the tiered routing service domain, and if the tgrp tag may contain a valid Tier Level designator to be used by the tiered routing service to apply to the given call in 405.

In one implementation in 407, it is determined if the international routing service is applicable for the given call. If the international routing service is applicable, it is checked in 408 if the call termination associated with the requested Tier (tgrp) is available. A received network request to route the call may be forwarded to check a status for a routing device in a network. In one implementation the call termination associated with the requested Tier may be "busy" or "congested" or "out-of-service". If the requested tier and routing is available or routing may determine the tier may be available on other similar element in 408, the call proceeds to 413 to a correspondent carrier tier.

If a determination is made that routing for a requested tier is available, the network request may instruct a network device for routing a call through a selected tier level. In the embodiment of FIG. 4, if the selected tier exists the truck-group info is passed to the international carrier in 412 from where the call is terminated to VoIP or TDM international correspondent carriers associated with the selected tier. But if the tier selected is reachable on another iteration for example SIP IMT/transit in 413, the contextual information is passed for the next element to process in 414. In this implementation, from 414 the call is terminated to the SIP-IMT/Transit truck in 415. In another implementation, a call from 412 may be terminated to VoIP or TDM international correspondent carriers associated with a tier in 416 without passing the trunk-group information to the international carrier from 412.

In one embodiment, if the requested tier is unavailable, the call proceeds to 411 for further processing as described below. In another implementation in 404, if it is determined that the tgrp/tgrp-context from the origination cannot be trusted for Tiered Routing service the call proceeds to 406. In another implementation in 405, if it is determined that the contextual information passed is not recognized or valid the call proceeds to 406. In yet another implementation, if the international routing service is not applicable in 407, the call proceeds to 406. In 406, the tgrp and tgrp-context from the Request URI are removed. In 409, an existing RFC handling options may be selected and a final 404 response to end the call is sent in 410 and the call is rejected in 418. In another implementation of 409, an existing RFC handling options may be selected and the call may be forwarded to 419 where the call may continue using normal procedures in 419.

In another implementation, a call may be forwarded to 411, where an existing RFC handling option may be selected and a final 606 response to end the call may be sent in 421 and the call may be rejected in 417. In yet another implementation, a call with existing RFC handling options in 411 may be sent to 419 where the call may continue by using normal procedures in 419.

Figure 5:
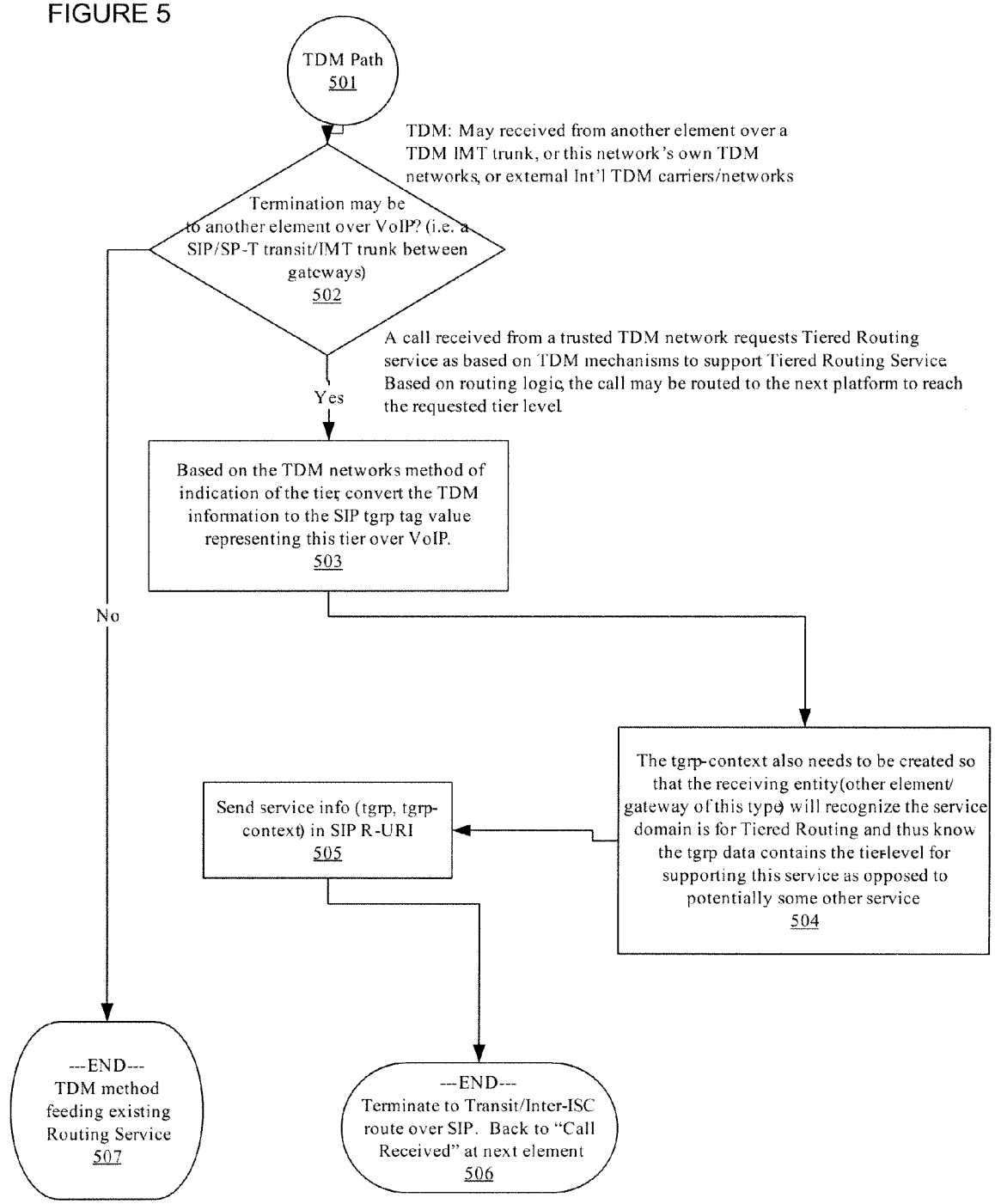
FIG. 5 shows an implementation of logic flow in one embodiments of TRE.

FIG. 5 is a logic flow of an implementation of one embodiment of TRE where a call is processed on a TDM path 501. A call may be received from another element over a TDM IMT trunk or external Int'l TDM carriers/networks. In 502, it is determined if termination may be to another element over VoIP for example, a SIP/SP-T transit/IMT trunk between gateways.

If a determination is made in 502 if the call is received from a trusted TDM network is requesting Tiered Routing service based on TDM mechanisms to support Tiered Routing Service. Based on routing logic, the call may be routed to the next platform to reach the requested tier level. In one implementation, based on the TDM networks method of indication of the tier, the TDM information may be converted to the SIP tgrp tag value representing the selected tier over VoIP in 503. In 504, the tgrp-context may need to be created so that the receiving entity (other element/gateway of this type) may be able to recognize the service domain is for tiered routing. Further it may be checked if the tgrp data contains the tier-level that may support tiered routing service as opposed to potentially some other service.

In one implementation in 505, the service info (for example, tgrp, tgrp-context) in SIP R-URI is sent and the call is terminated to Transit/Inter-ISC route over SIP in 506. In another embodiment, if the termination is not to another elements or routing devices or VoIP the call proceeds to 507 where the call is routed using existing routing.

Figure 6A:
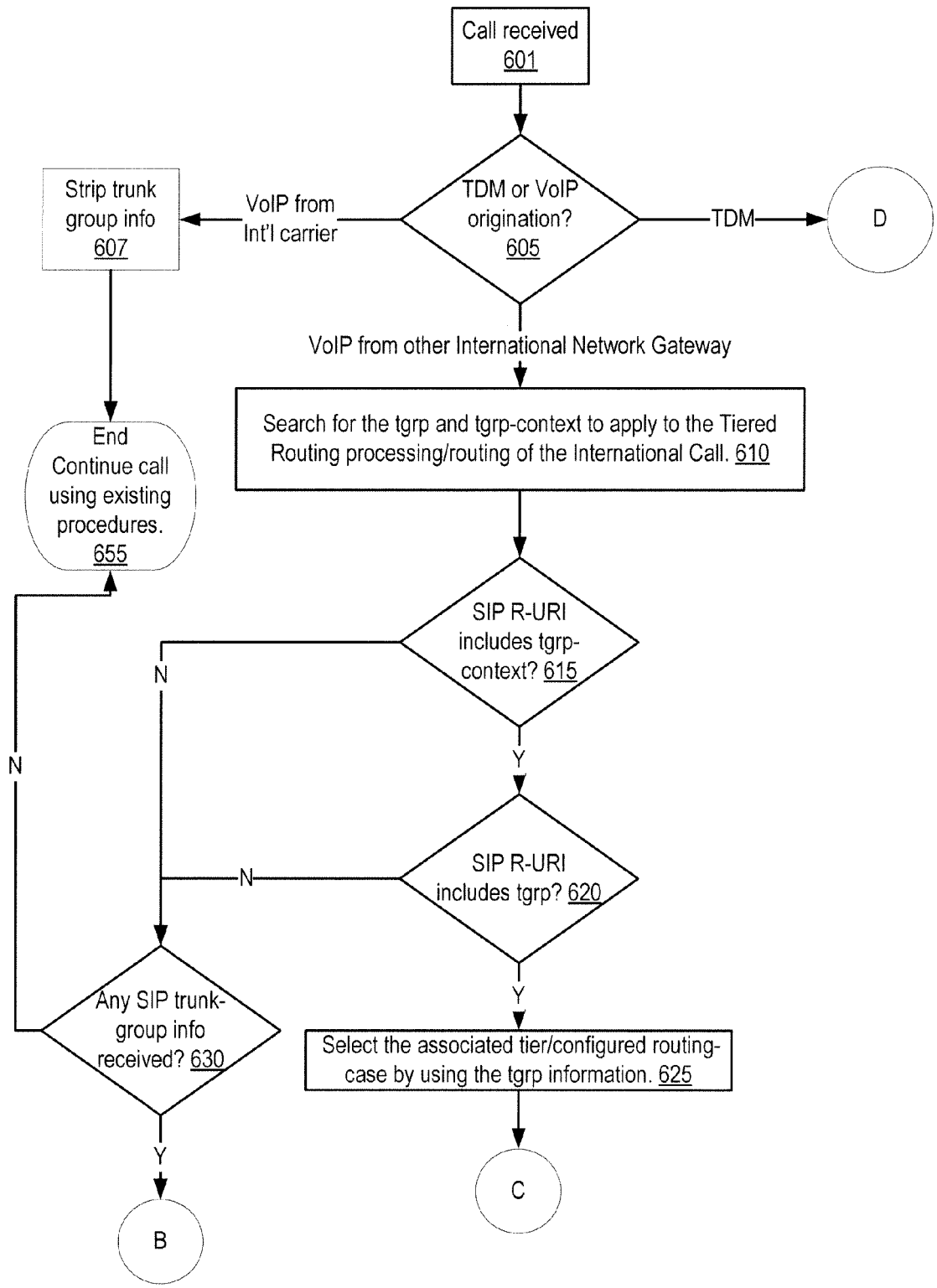
FIGS. 6A-6B show implementations of logic flow in two embodiments of the TRE.
Figure 6B:
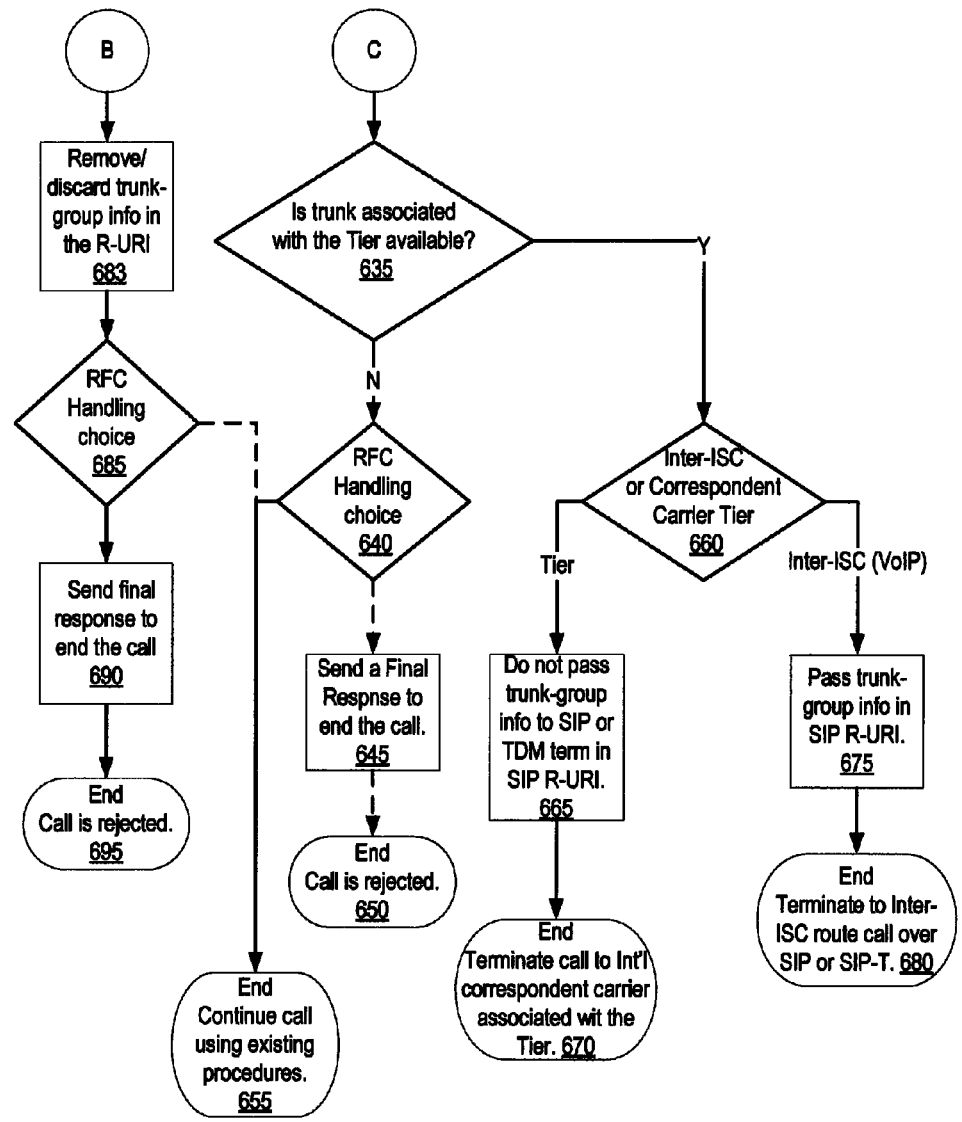

FIGS. 6A and 6B show alternative embodiments of TRE. FIGS. 6A and 6B are a logic flow of an implementation of two embodiments of International Network Gateway processing of SIP Trunk-Group for Tiered Routing. In one embodiment, a call received may be from a TDM network whereas in a second embodiment a call may originate from a VoIP source.

In one embodiment, a call 601 may be received by an International Gateway such as AXE telephone exchange by Ericsson or ENGINE. Such an International Gateway may be configured on Intra-IMT to accept a predefined dial plan. In one embodiment, this predefined dial plan may be handled by an international gateway such as Nortek UCS load concept utilizing Serving Translation Scheme (STS). This STS routing plan may be assigned to incoming trunk of a customer/reseller to given them tier 'N' dial plan for IDDD service. The STS is a 3-digit code which allows the switches to separate customers' traffic into unique partitions and derive a given routing plan to apply to the calls, while still allowing the calls to flow over common resources or IMT's. STS values are uniquely assigned to a customer or groups of customers (via configuration at the customer's originating trunk) who will be using the same routing scheme.

In an embodiment, the International Gateway may be configured on Intra-IMT to pick out a Partition. The Partition information may not be unique to a customer and may be derived from the STS and is associated with the network configuration. The Partition may be sent via the ISUP I3PA signaling between switches (as a 3-digit "3PART" Called Party Number prefix) to communicate the unique dial plan partition to be applied to process the call at each switch. At each switch the Partition information may be used to re-derive an STS (via configuration/PARTRAN3) which determines where the switch will route the call via configuration.

The International Gateway may be configured in an embodiment to pick out the 3PART from the prefix digit and use that value to affect the final route case selection to a specific tier/trunk(s) associated with the given 3PART value. In another embodiment, the 3PART value may be used to indicate the routing plan for tier "N" termination on the International Gateways.

In an embodiment of FIG. 6A, after receiving a call in step 601, the International Gateway may determine if the call origination is TDM or VoIP in step 605. If the call originates from a VoIP source from an international carrier, the International Gateway may be configured to strip trunk group information in 607 if trunk-group information such as tgrp and tgrp-context is received. These SIP tags/parameters may be part of the Request URI userinfo. The 'tgrp-context' may indicate in what realm the tgrp information is valid. The 'tgrp' may indicate the trunk-group to be routed to, by a platform identified in the descriptor of the tgrp-context tag.

In one embodiment two IP-based flags or settings may allow the redirect Server (RS) to control whether a given customer's International calls will receive Tiered Routing into the International network and what will be provided to NGW's to control this feature. These settings or configurations may be designed to be generic and flexible to support other SIP Trunk-group services without impacting the provisioning systems.

If in 607 NS/RS receives tgrp and/or tgrp-context from a customer, this information may be stripped and discarded. This is done for security reasons and to remove any design impact on IASA/RS to have to implement a "tgrp trusted" flag and logic. RS may create the tgrp & tgrp-context to carry the "Tier N" level information with the context identifying it is for Engine use etc. The format of the information that goes into the tgrp & tgrp-context are defined by tags such as, but not limited to, TrunkGroupServices and DeliverTrunkGroupinfo.

In the embodiments of FIGS. 6A and 6B the first setting may be 'TrunkGroupServices' consisting of parameters: "SIP Trunk-group Service ID," "SIP Trunk-group service supported domain" and "trunk-related additional service attribute." The second setting may be 'DeliverTrunkGroupInfo' that may be either Numeric codes or Character field for defining a Domain Name or a "+" Global descriptor. This setting may indicate on per destination NGW IP (rsg-winfo) whether the SIP Trunk-group tags should be passed, and if passed, how to code the tgrp-context. RS will use this information to do the logic checks for the delivery or not of the SIP Trunk-group tags as well as the actual tgrp-context coding.

In one implementation a setting may take a form similar to the following example:

0=Don't send Trunk-group information. [Recommended setting for Domestic NGW's/CS2K's and all IP destinations]

1=Use originating customer IP/gateway 'SIPTrunkGroupServicesDomain' value to create the tgrp-context value. [RECOMMENDED for Int'l NGW's/Engine]

2=Use+CC associated with the origination (from ANI or Originating IP/gateway CC setting) to use as the tgrp-context value. This logic is considered OPTIONAL FLEXIBILITY and not needed for Int'l Tiered Routing.

3=Code tgrp-context based on the NGW's provisioned domain name or +global descriptor (i.e. in the SELECTED NGW's 'SIPTrunkGroupServicesDomain' setting—or—similar future setting that is intended to only be used for the terminating TDM direction).

"Domain name"—or—+global descriptor=Character input field for specifying a host gateway, subdomain, service provider Domain Name, or +global descriptor to use as the tgrp-context value.

In one implementation potential results from different settings may take a form similar to the following example:

Example of:
DeliverTrunkGroupInfo=1:
tgrp-context=IntlTieredRouting.com;
This may be used as it identifies the service domain for using the tgrp format, where the domain name is from the originating TrunkGroupServices setting.

DeliverTrunkGroupInfo=2:
tgrp-context=+1; (for US VoIP origination call),
or for example
tgrp-context=+44; (for UK VoIP origination call).
This option allows tgrp's to be processed differently at the same NGW's based on what country/caller originated the call.

In another implementation the tag settings may be as follows:
DeliverTrunkGroupInfo=3:
tgrp-context=Engine2.exmaple.ipcomm.com;
This may allow a domain name (or +global descriptor) to be obtained based on the terminating NGW's own 'SIPTrunkGroupServicesDomain' (or similar setting) to provide the specific NGW a tailored context it may support. This is a safety to cover different NGW vendor implementations. Furthermore the NGW's 'SIPTrunkGroupServicesDomain' (or similar setting) acts as a default context for setting Option-1 above if no originating service domain info was found.

In another embodiment, a "trusted carrier" flag may be implemented on an originating IP with logic to check that a received tgrp-context is served or recognized. After stripping any trunk-group information in 607 a call may be routed to an International location and may require special tiered routing processing. Not all originating IP's or Automatic Number Identification's (ANI) or TN's (for ANI-profile) may indicate routing to a specific tier-level of international routing applied to their IDDD calls, so a check may be done to see if Tiered routing has been specified as a service. For ANI-profile customers, a field in the subscriberID database may be checked to identify support for International Select Tiered Routing and any tier level specified.

If there is no tiered routing information, the call may directly go to Network Gateway Selection to get direct termination to a best available International Network Gateway for serving termination to a given country. However, for customers with International Tiered Routing, SIP Trunk-group information based on the ANI/TN or originating IP/gateway setting is created for International Tiered Routing service. In an embodiment with the ANI/TN based setting, IASA may make this information available to the RS in the subscriberID database. In another embodiment, with an Originating IP/gateway information setting, the information may be made available to the RS in the rsgwinfo table.

RS may use this information to do logic checks and SIP trunk-group tag creation. In one embodiment, TrunckGroupServices allows for new SIP trunk-group type services that are flexible. Many different formats in different embodiments may be chosen for the tier level for example 0, 0r 64, or Tier-0 or Tier-64 or "no-preference" or "Premium" or "MobileVzW," or "TDM-only" etc. Further, in one embodiment for the existing term logic, Network Gateway Selection may continue to deliver SIP Trunk-group information.

In yet another embodiment, a specific Network Gateway Selection table is used to map the existing information to a NGW that is determined by the Customer Routing Plan ID set for the originating IP/customer. In one embodiment, wholesale customer with International Select Tiered Routing may provide a customer with a routing plan ID value such that the Network Gateway Selection table used will be one that is provisioned for terminating to the International NGW Engine gateways.

In one embodiment, it may be checked if the SIP Trunk-group information is to be delivered. This check is based on the selected NGW's IP provisioning where the "DeliverTruckGroupInfo" may instruct the RS on the creation and coding of the tgrp-context. Depending on a setting received SIP trunk group information is said to be delivered or not. In one embodiment, the resulting SIP R-URI userinfo is sent to the NGW to be routed to a destination.

In the embodiment of FIGS. 6A and 6B, if no International Tiered routing is determined in step 607 and the SIP trunk-group information is stripped, the call continues in 655 using the other existing procedures.

In 605 of the embodiment, if the VoIP call received is from NS/RS or Inter-ISC SIP/SIP-T trunk or other International Gateway then step 610 implements a handling mechanism to search for the trgp and tgrp-context tags. This may be to extract Tiered routing processing or routing of the International call. If SIP R-URI does not include or recognize the trgp and tgrp-context tags in steps 610 and 615 then a check to search for any SIP Trunk-group information is performed in step 630. If no tags are recognized or received in step 630 the call proceeds using other existing procedures in step 655. In step 630, it is determined if any SIP Trunk-group information is Received. The embodiment in FIG. 6B removes and discards any received trunk-group info in the R-URI in step 683.

In one embodiment if the 'tgrp-context' is present without the 'tgrp-context' a protocol error occurs. The dashed lines in the figures represent the VoIP and shared-IMT TDM solutions. In the embodiment of FIG. 6B, in step 685, there are two different protocols to handle this. Either a final response 404 to end the call is sent in step 690 and 695. Or the RFC may ignore the tags and strip any trunk-group tags to continue with a call as embodied in step 655 of FIG. 6B.

In the embodiment of FIGS. 6A and 6B, a determination is made in 615 and 620 as to whether the SIP R-URI includes the tgrp and tgrp-context tags. If both the tgrp and tgrp-context tags are present, then in 625 the tgrp information is manipulated to select the associated tier or configured routing-case. If the tags are not present, then a check is performed in 630 to see if any SIP trunk group info is received. The embodiment in FIG. 6B removes and discards any received trunk-group info in the R-URI in step 683.

In one embodiment if the 'tgrp-context' is present without the 'tgrp-context' a protocol error occurs. In the embodiment of FIG. 6B, in step 685, the RFC specifies two different protocols to handle this. A final response 404 may be send to end the call in step 690 and 695. Or the RFC may ignore the tags and strip any trunk-group tags to continue with a call as embodied in step 655 of FIG. 6B.

In one implementation shown in FIG. 6B, it is checked in 635 if the trunk associated with the Tier is available and ready. The trunk may be in many states including, but not limited to, busy, congested or out-of-service. If the requested tier is unavailable, the RFC specifies a handling choice to send a final 606 response to end the call in 645. After the response is sent, the call is rejected as seen in 650.

However, if a determination is made in 635 that the requested tier or Inter-ISC routing is available, the Carrier Tier information associated is manipulated 665. If the requested tier is available then the trunk-group info is not passed to SIP or TDM termination in SIP R-URI in 665. After the tgrp and tgrp-context in SIP R-URI is removed in step 665, the call is routed to the International correspondent carrier associated with the tier in 670. However, if the routing information is Inter-ISC (VOIP) in 660, then the trunk-group info including, but not limited to, tgrp, tgrp-context in SIP R-URI is passed in 675. And the call is routed through a Inter-ISC route over SIP or SIP-T in step 680.

Figure 7:
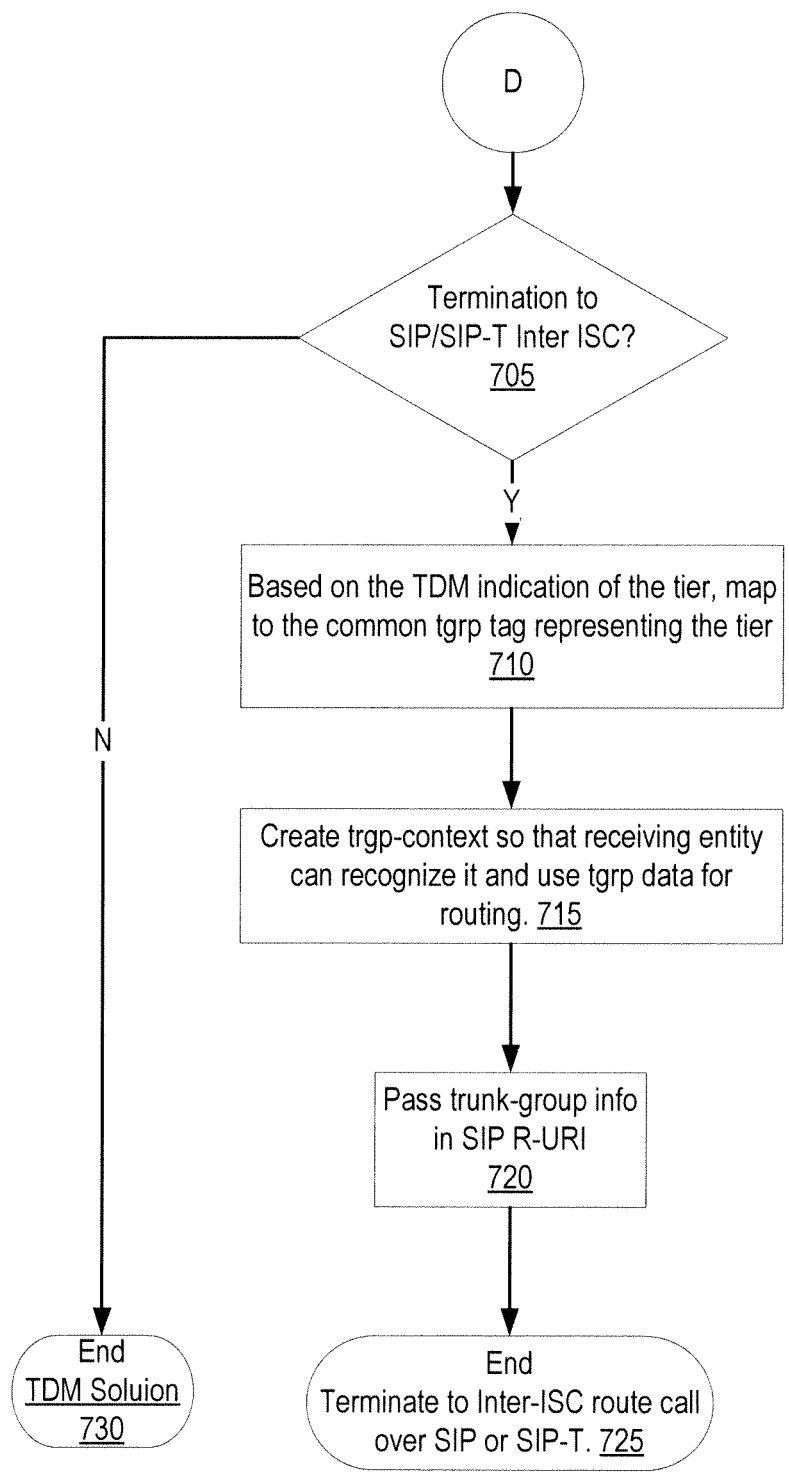
FIG. 7 shows an implementation of logic flow in two embodiments of TRE.

FIG. 7 shows an implementation of International NGW Inter-ISC Creation of SIP Trunk-Group Tiering information. In this embodiment of FIG. 6A, it is determined if the call received is TDM at 605. If routing is required to another international Network Gateway this may be done over VoIP interconnects. But when the Inter-ISC is a SIP or SIP-T trunk the Tier information may be transported, in one implementation, using a SIP mechanism. In 705 a determination is made whether the call termination is to SIP/SIP-T Inter ISC. If the termination is not to SIP or SIP-T over Inter-ISC then a TDM solution may be followed in 730. However, if the determination indicates that the termination is to SIP or SIP-T over Inter-ISC, then in 710, the TDM based tier is mapped to the tgrp tag representing the chosen tier.

In an implementation, the TDM tier information may be unique to a single gateway or the SIP tgrp may be unique for that tier for all gateways that are configured to recognize a given tgrp-context. In 715 the tgrp-context is created so that the receiving entity may be able to recognize and use the tgrp data for routing. The resulting truck-group information is passed in SIP R-URI in step 720. The call is terminated to inter-ISC route call over SIP or SIP-T and the International NGW processes the call with the tier routing selected in 725.

In yet another embodiment, it may not be required that the International NGW create originating trunk-group information in the CONTACT header in either direction. But if it is received it may not be stripped otherwise the RFC 3261 Contact header handling may be broken as endpoints may expect to see the same information in subsequent in-dialog requests.

The tier level selected for/by the VoIP customer or carrier will make certain that an associated set of International carriers (approved for the given tier level of service) will be chosen when handing the call off to the international networks. In another implementation VNET or private dialing from VoIP provides for a tgrp tag that may carry the Dedicated Access Line (DAL) trunk to reach the customer facility. In another embodiment, routing specific EMEA National VoIP TDM originations may be routed to specific premium or non-premium Wholesale EMEA TDM carriers and vice versa.

In an another embodiment, routing of VoIP traffic may be forced to different LD networks such as Option1 and Option2 networks. This may be used to force rerouting traffic from f-MCI Option 2 LD network, due to capacity issues, to f-WCOM Option 1 LD network. This also may be an alternative to using carrier identification code (CIC) routing. In one implementation this routing may be used to get 911 calls from VoIP to the Local networks/PSAPs.

Figure 8:
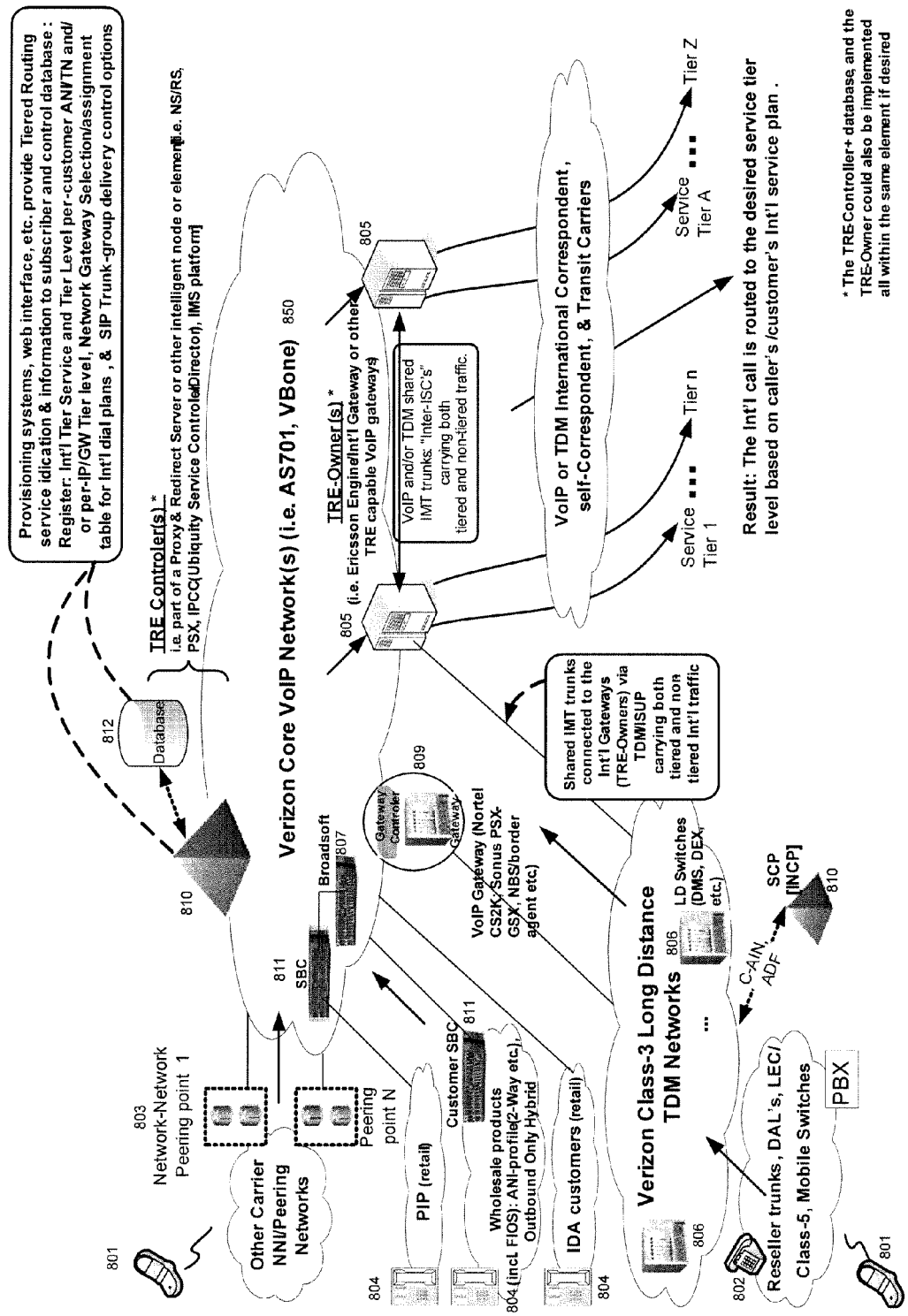
FIG. 8 shows an implementation of an overall network architecture in one embodiment of TRE.

FIG. 8 shows an implementation of data flow among and between a network and its components in an overall network architecture in one embodiment. In this implementation, a Verizon VoIP and TDM originated international/IDDD call that requires a specific international service tier level is routed. In one embodiment, a mobile device 801 may be connected to Peering points 803 through wireless servers via NNI Peering networks, for example, Verizon Wireless for interconnecting together to exchange traffic on a peering basis. Other communication devices, for example a Public Switched Telephone Network (PSTN) Phone 802 or cellular device 801 or IP phone 804 may be connected through wireless or broadband networks to a TDM Network such as, but not limited to, the Option 1 TDM Network (Verizon Class-3 Long Distance). The communications devices 802 may be connected to switch boards through broadband or wireless networks or PSTN networks. In one embodiment, IP phone 804 is apart of PIP (retail) or an IDA customers (retail) or wholesale products (including FIOS): ANI-profile (2-Way etc.), Outbound Only, Hybrid etc.

The implementation also depicts a Verizon Core VOIP Network 850 such as VBone Network 850 or AS-701 VzB Core IP Network 850. The calls from 801, 802, and 804 are routed to the Verizon Core VoIP Network in this implementation. In this implementation, a call from 802 is routed on the Verizon Class-3 long Distance TDM networks where LD switches 806 reside. These LD switches 806 may be DMS, DEX, or the like. The call is routed using shared IMT trunks connected to the tier-owning international gateways (TRE-owners) via TDM/ISUP carrying both tiered and non-tiered international traffic. In this implementation, the Ericsson engine 805 is the TRE-owner. In other implementations it may be any other TRE capable VoIP gateway. In this implementation, 807 is a retail VoIP Centrex service platform from Broadsoft that is connected to the SBC 811. This may be an example of a PIP customer interface for Tiered Routing.

The networks in the implementation of FIG. 8 also include several servers for example, 810 a Network Server or Redirect Server or INCP or IPECC VoIP. Gateway 809 may be used to connect two network to route traffic between national and international networks. Similarly, International gateways 805, for example Ericsson AXE are configured to receive or send or reroute traffic in a network. Several databases 812 or gateway selection tables for international prefixes and SIP trunk-group delivery information may also reside on the network 850. In this implementation, TRE controllers are part of a proxy or redirect server or other intelligent node or element for example NS/RS, PSX, IPCC (ubiquity Service Controller/Director) or IMS platform. The embodiment in FIG. 8 also shows provisioning systems, web interface, etc. to provide tiered routing service indication and information to subscriber and control database. The databases may also include registration services including the international tier service and tier level per customer ANI/TN and/or per-IP/GW Tier level, network gateway selection/assignment table for international dial plans and SIP trunk-group delivery control options.

In the network implementation of FIG. 8, a customer Session Border Control 811 (SBC) is employed in a VoIP network. SBC 811 may be put into the signaling and media path between calling and called party. Both signaling traffic and media traffic (voice, video etc) cross the SBC 811 which may function as firewalls, protocol transcoders, bandwidth managers, etc.

In FIG. 8, engine 805 routes calls through VoIP or TDM international correspondent, self-correspondent and transit carriers. The international call is routed to the desired service tier level based on a caller's or customer's international service plan.

In one embodiment, the TRE-controller and database, and the TRE-owner could also be implemented all within the same element.

TRE Controller

Figure 9:
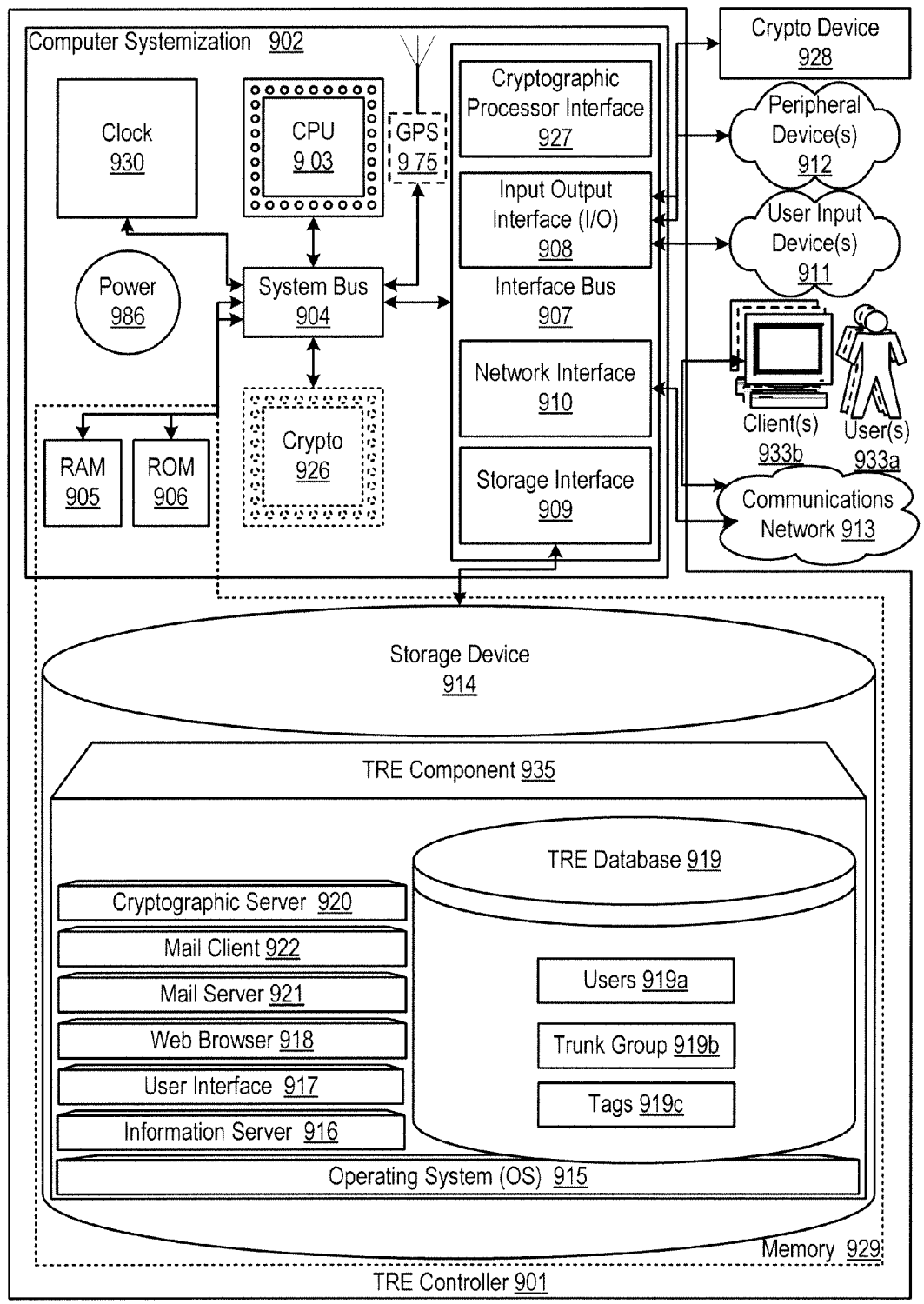
FIG. 9 is of a block diagram illustrating embodiments of the TRE controller.

FIG. 9 illustrates inventive aspects of a TRE controller 901 in a block diagram. In this embodiment, the TRE controller 901 may serve to aggregate, process, store, search, serve, identify, instruct, generate, match, and/or facilitate interactions with a computer through telecommunications technologies, and/or other related data.

Typically, users, which may be people and/or other systems, engage information technology systems (e.g., commonly computers) to facilitate information processing. In turn, computers employ processors to process information; such processors are often referred to as central processing units (CPUs). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the TRE controller 901 may be connected to and/or communicate with entities such as, but not limited to: one or more users from user input devices 911; peripheral devices 912; a cryptographic processor device 928; and/or a communications network 913.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The TRE controller 901 may be based on common computer systems that may comprise, but are not limited to, components such as: a computer systemization 902 connected to memory 929.

Computer Systemization

A computer systemization 902 may comprise a clock 930, central processing unit ("CPU(s)" and/or "processor(s)"

(these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effect communications, operations, storage, etc. Optionally, the computer systemization may be connected to an internal power source 986. Optionally, a cryptographic processor 926 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the TRE controller and beyond through various interfaces. Should processing requirements dictate a greater amount speed and/or capacity, distributed processors (e.g., Distributed TRE), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the TRE may be achieved by implementing a microcontroller such as CAST's R8051XC2 microcontroller; Intel's MCS 51 (i.e., 8051 microcontroller); and/or the like. Also, to implement certain features of the TRE, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the TRE component collection (distributed or otherwise) and/or features may be implemented via the microprocessor and/or via embedded components; e.g., via ASIC, coprocessor, DSP, FPGA, and/or the like. Alternately, some implementations of the TRE may be implemented with embedded components that are configured and used to achieve a variety of features or signal processing.

Depending on the particular implementation, the embedded components may include software solutions, hardware solutions, and/or some combination of both hardware/software solutions. For example, TRE features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the TRE features. A hierarchy of programmable interconnects allow logic blocks to be interconnected as needed by the TRE system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the TRE may be developed on regular FPGAs and then migrated into a fixed version that more resembles ASIC implementations. Alternate or coordinating implementations may migrate TRE controller features to a final ASIC instead of or in addition to FPGAs. Depending on the implementation all of the aforementioned embedded components and microprocessors may be considered the "CPU" and/or "processor" for the TRE.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the TRE thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the TRE controller is accessible through remote clients 933*b* (e.g., computers with web browsers) by users 933*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed TRE), architectures may similarly be employed to pool, load balance, and/or otherwise increase the communicative bandwidth required by the TRE controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 may be card readers, dongles, finger print readers, gloves, graphics tablets, joysticks, keyboards, mouse (mice), remote controls, retina readers, trackballs, trackpads, and/or the like.

Peripheral devices 912 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the TRE controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the TRE controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the TRE controller and/or a computer systemization may employ various forms of memory 929. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the TRE component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the TRE controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the TRE controller to communicate with other entities through a communications network 913. Various communication protocols may be used by the TRE controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the TRE controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the TRE database 919, operating systems, other program components, user interfaces, Web browsers, and/or the like.

Access to the TRE database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the TRE. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the TRE as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the TRE enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the TRE.

Access to the TRE mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the TRE may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the TRE component to engage in secure transactions if so desired. The cryptographic component facilitates the secure accessing of resources on the TRE and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The TRE Database

The TRE database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the TRE database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the TRE database is implemented as a data-structure, the use of the TRE database 919 may be integrated into another component such as the TRE component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919*a-c*. A Users table 919*a* may include fields such as, but not limited to: subscriber_ID, subscriber_name, subscriber_info, hardware_ID, tier_level, originating_IP, ANI_country, TN_country and/or the like. A Trunk Group table 919*b* may include fields such as, but not limited to: subscriber_ID, SIP_service_ID, SIP_supported_domain, SIP_Additional_Service, protocols, Tier_Level, SIP_service_availability, SIP_destination, SIP_origination, and/or the like. A Tags table 919*b* may include fields such as, but not limited to: service_direction, userinfo_ID, tag_request_URI, host_request_URI, tier_level, network_info, tgrp_info, tgrp_context_info time, date, source, destination, and/or the like. These tables may support and/or track multiple entity accounts on the TRE controller.

In one embodiment, the TRE database may interact with other database systems. For example, employing a distributed database system, queries and data access by search TRE component may treat the combination of the TRE database, an integrated data security layer database as a single database entity.

In one embodiment, user programs may contain various user interface primitives, which may serve to update the TRE. Also, various accounts may require custom database tables depending upon the environments and the types of clients the TRE may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919*a-c*. The TRE may be configured to keep track of various settings, inputs, and parameters via database controllers.

The TRE database may communicate to and/or with other components in a component collection, including itself, and/or facilities of the like. Most frequently, the TRE database communicates with the TRE component, other program components, and/or the like. The database may contain, retain, and provide info, illation regarding other nodes and data.

The TREs

The TRE component 935 is a stored program component that is executed by a CPU. In one embodiment, the TRE component incorporates any and/or all combinations of the aspects of the TRE that was discussed in the previous figures. As such, the TRE affects accessing, obtaining and the provision of information, services, transactions, and/or the like across various communications networks.

The TRE component is configurable to access, calculate, engage, exchange, generate, identify, instruct, match, process, search, serve, store, route and/or facilitate tiered routing between TRE components and/or affiliated entities, handling a call for guaranteed delivery, routing traffic to a network that is at a selected International tier level, manipulating the tgrp information, forced routing VOIP traffic to selected LD networks, routing 911 calls, controlling telephony traffic and/or the like and use of the TRE.

The TRE component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the TRE server employs a cryptographic server to encrypt and decrypt communications. The TRE component may communicate to and/or with other components in a component collection, including itself, and/or facilities of the like. Most frequently, the TRE component communicates with the TRE database, operating systems, other program components, and/or the like. The TRE may contain, communicate, generate, obtain, and/or provide program component, system, user, and/or data communications, requests, and/or responses.

Distributed TREs

The structure and/or operation of any of the TRE node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the TRE controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method, comprising:
receiving a network request for routing a call;
identifying originating, subscriber, and delivery information associated with the call;
determining a subscriber's tier of service based in part on the subscriber information associated with the received call;
determining a tier level for international routing associated with the call based on information comprising the subscriber's tier of service;
creating SIP context tags for the determined tier level for international routing, the SIP context tags overriding a received tier of service in the network request and designating a trunk or trunk group for routing the call;
validating the tier level for international routing associated with the call;
formatting the tier level for international routing associated with the call;
checking availability of a terminating port associated with the tier level;
instructing a routing device with the network request to route the call and the tier level for international routing, based on the checked availability with the tier level, effecting selection of a carrier corresponding to the tier level to route the call, and routing the call based on the tier level and the trunk or trunk group.

2. The method of claim 1, wherein the method further comprises:
determining if the call is from a Time Division Multiplexing network.

3. The method of claim 2, wherein the method further comprises:
determining if the call from a Time Division Multiplexing network requires transmission over Voice Over Internet Protocol.

4. The method of claim 3, wherein the method further comprises:
mapping the tier level for international routing to the SIP context tag.

5. The method of claim 4, wherein the method further comprises:
transmitting the mapped SIP context tag to a corresponding international gateway.

6. The method of claim 1, wherein the originating information further includes an Automatic Number Identification.

7. The method of claim 1, wherein the context tags each indicate Trunk-group service information.

8. The method of claim 1, wherein the context tags each indicate a domain name.

9. The method of claim 1, wherein the context tags each indicate a global descriptor.

10. The method of claim 1, wherein the context tags each includes a Dedicated Access Line.

11. An apparatus, comprising:
a network interface;
a memory;
a processor disposed in communication with the memory and the network interface;
a redirector comprising a plurality of processing instructions, stored in the memory and issuable by the processor, wherein the instructions are configured to receive a network request for routing a call to an international destination, examine call information for the destination acquired during the request and identify originating, subscriber, and delivery information associated with the call received over the network interface;
a database comprising a plurality of processing instructions, stored in the memory and issuable by the processor, wherein the instructions are configured to provide a pre-selected tier level associated with the call for the redirector; and
a routing engine comprising a plurality of processing instructions, stored in the memory and issuable by the processor, wherein the instructions are configured to create SIP context tags for the database provided pre-selected tier level for international routing, the SIP context tags overriding a received tier of service in the network request and designating a trunk or trunk group for routing the call, validate over the network interface the tier level for international routing associated with the call, check availability of a terminating port associated with the tier level, effect a selection by the redirector of a carrier corresponding to the tier level to route the call; and route the call based on the tier level provided by the database and the trunk or trunk group.

12. A tiered routing system, comprising:
a network interface;
a memory;
a Session Border Control having a processor disposed in communication with the memory and the network interface configured to obtain network instructions for routing a call to an international destination;

a router, disposed in communication with the Session Border Control, comprising a plurality of processing instructions stored in a router memory and issuable by a router processor, wherein the instructions are configured to determine originating, subscriber, and delivery information associated with the network instructions for routing the call over a router interface;

a database configured to provide a pre-selected tier level assigned with the originating, subscriber, and delivery information associated with the call;

a redirector, disposed in communication with the router, configured to review the originating and subscriber information acquired by the router and verify a tier level associated with the call;

a routing engine, disposed in communication with the router, configured to create SIP context tags for the database provided pre-selected tier level for international routing, the SIP context tags overriding a received tier of service in the network request and designating a trunk or trunk group for routing the call;

a switch comprising a plurality of processing instructions stored in a switch memory and issuable by a switch processor, wherein the instructions are configured to validate over a switch interface the tier level for international routing associated with the call received by the router and passing the tier level for routing the call to the international destination; and a gateway comprising a plurality of processing instructions stored in a gateway memory and issuable by a gateway processor, configured to check availability of a terminating port associated with the tier level as determined by the routing engine and validated by the switch, effect a selection by the redirector of a carrier corresponding to the pre-selected tier level to route the call and route the call based on the pre-selected tier level provided by the database and the trunk or trunk group.

13. The system of claim 12, wherein the routing engine is further configured to determine if the call is from a Time Division Multiplexing network.

14. The system of claim 13, wherein the routing engine is further configured to determine if the call from a Time Division Multiplexing network requires transmission over Voice Over Internet Protocol.

15. The system of claim 14, wherein routing engine is further configured to
map the tier for international routing to the SIP context tag.

16. The system of claim 15, wherein the switch is further configured to
transmit the mapped SIP context tag to a corresponding international gateway.

17. The system of claim 12, wherein the originating information further includes an Automatic Number Identification.

18. The system of claim 12, wherein the context tags each indicate Trunk-group service information.

19. The system of claim 12, wherein the context tags each indicate a domain name.

20. The system of claim 12, wherein the context tags each indicate a global descriptor.

21. The system of claim 12, wherein the context tags each includes a Dedicated Access Line.

* * * * *